United States Patent [19]

Fuelberth et al.

[11] Patent Number: 4,938,738

[45] Date of Patent: Jul. 3, 1990

[54] TWO-SPEED DRIVE ARRANGEMENT

[75] Inventors: Walter K. Fuelberth, Mesa, Ariz.; Andrew Fedor, Jr., Livonia, Mich.; Richard J. Murphy, Elma, N.Y.

[73] Assignee: General Motors Corporation, Detroit, Mich.

[21] Appl. No.: 354,959

[22] Filed: May 22, 1989

[51] Int. Cl.[5] .............................. F16H 3/44
[52] U.S. Cl. ..................... 475/317; 475/269
[58] Field of Search ............ 475/317, 320, 269, 311, 475/314, 323, 326

[56] References Cited

U.S. PATENT DOCUMENTS

| | | | |
|---|---|---|---|
| 2,044,660 | 6/1936 | Alden | 475/314 |
| 2,068,437 | 1/1937 | Starr | 475/320 |
| 2,115,963 | 5/1938 | Osborne | 475/314 X |
| 2,971,406 | 2/1961 | Senkowski et al. | 475/320 X |
| 4,063,470 | 12/1977 | Kelbel | 475/320 |
| 4,074,591 | 2/1978 | Dick | 475/317 X |
| 4,189,960 | 2/1980 | Holdeman | 74/781 R |
| 4,347,762 | 9/1982 | Holdeman | 475/320 X |
| 4,489,626 | 12/1984 | Lemon | 475/314 X |
| 4,549,449 | 10/1985 | Miller et al. | 74/785 |

Primary Examiner—Leslie A. Braun
Assistant Examiner—Chris Campbell
Attorney, Agent, or Firm—Donald F. Scherer

[57] ABSTRACT

A two-speed drive arrangement has input and output shafts operatively interconnected by a clutch and a planetary gear arrangement. The clutch us selectively movable to three positions to establish the direct drive, bypassing the planetary gear arrangement, a reduction drive through the planetary gear arrangement and a neutral condition. In both the neutral condition and the direct drive, the planetary gear arrangement is free of direct rotary influence from the input and output shafts and components thereof may remain stationary.

3 Claims, 1 Drawing Sheet

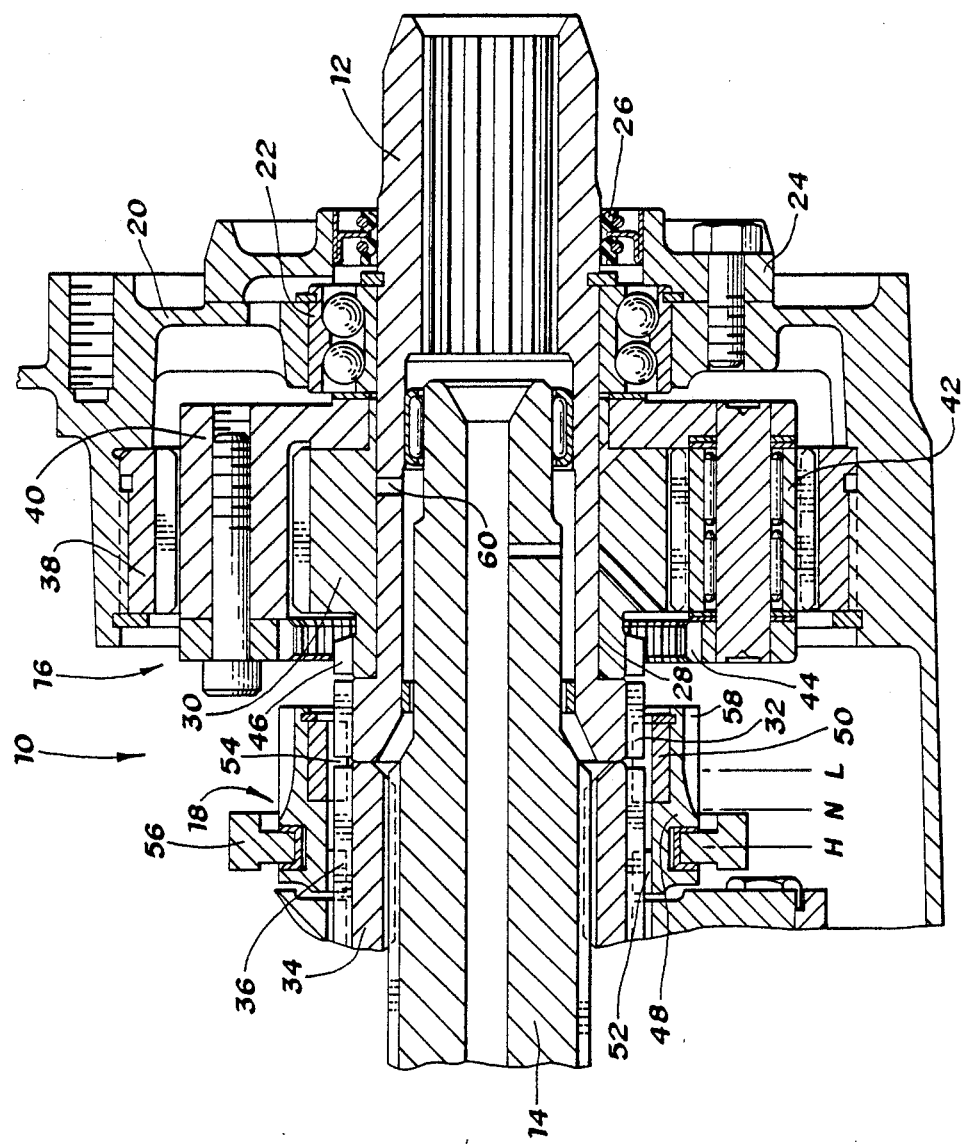

TWO-SPEED DRIVE ARRANGEMENT

BACKGROUND OF THE INVENTION

This invention relates to two-speed gear arrangements, and more particularly, to such gear arrangements wherein a single clutch assembly is operable to establish a direct drive, a ratio drive and a neutral condition in the gear arrangement.

Prior art two-speed gear arrangements have at least one member of the gear arrangement continuously driven by either the input or output shaft. When one of the gear members is continuously driven, the overall efficiency of the gear arrangement is significantly reduced. The spinning gears generate heat and absorb power such that significant amounts of lubrication fluid must be distributed to the gearing. Alternately, the prior art has utilized a brake and clutch mechanism such that the gear arrangement is rotated as a single unit during the direct drive. However, during the ratio drive, the clutch unit must rotate as an open disk device which is also a power waster and requires cooling fluid. During direct drive, the brake unit which is generally a disk device runs in the open condition and is therefore a power waster and requires lubrication and cooling fluid.

SUMMARY OF THE INVENTION

The present invention has a clutch arrangement that is effective to disconnect the planetary gear arrangement from being driven by either of the rotating shafts during direct drive operation. This clutch arrangement is a mechanical jaw or tooth type clutch device, such that an open running condition of friction plates is not present. The clutch arrangement bypasses the gear arrangements and connects the input shaft with the output shaft.

During a neutral condition, the clutch arrangement is positioned to disconnect both the input shaft and the output shaft from the gear arrangement. During an underdrive or reduction ratio, the clutch arrangement is effective to connect a sun gear of a planetary gear set to the input shaft and a planet carrier to the output shaft. The ring gear of the planetary arrangement is continuously grounded to a stationary housing. As is well known, the planet carrier will rotate at a reduced speed relative to the sun gear.

The clutch arrangement has two sleeve members, a first of which is rotatably supported in the second. The first sleeve member is positioned to always rotate with the input shaft while the second sleeve member always rotates with the output shaft. Through axial positioning of the second sleeve and with it the first sleeve, the sun gear and input shaft are connected by the first sleeve member while the carrier and the output shaft are connected by the second sleeve member.

In another axial position of the second sleeve, the first sleeve connects the input shaft to the output shaft. When the first sleeve is connecting the input shaft to the sun gear, relative rotation between the two sleeves will occur. Also, when the two-speed arrangement is neutral, the two sleeves can rotate relative to each other.

It is an object of this invention to provide an improved two-speed drive arrangement, wherein a planetary gear unit is employed to provide one drive ratio between an input shaft and an output shaft, and also wherein, the planetary unit is disconnected from the input and output shafts and bypassed during a direct drive ratio, and further wherein the gear unit is disconnected from both shafts during neutral condition.

It is another object of this invention to provide an improved two-speed drive arrangement wherein a clutch mechanism is manipulated to establish a ratio drive, a direct drive in a neutral condition between an input shaft and an output shaft by connecting one member of a planetary gear arrangement to the input shaft and another member of the planetary gear arrangement to the output shaft during the ratio drive, by connecting the input shaft directly to the output shaft while disconnecting the planetary gear arrangement from both shafts during the direct drive and by disconnecting the input shaft from the output shaft and from the planetary gear arrangement during the neutral condition.

These and other objects and advantages of the present invention will be more apparent from the following description and drawing.

DESCRIPTION OF THE DRAWING

The drawing is a cross sectional elevational view of a portion of the drive arrangement incorporating the present invention.

DESCRIPTION OF THE PREFERRED EMBODIMENT

There is seen in the drawing a two-speed drive arrangement, generally designated 10, including an input shaft 12, and output shaft 14, a planetary gear arrangement 16 and a clutch assembly 18. The input shaft 12 is rotatably supported in a housing 20 by a ball bearing assembly 22, which in turn is positioned partially by an end cap or cover 24.

The cover 24 supports a seal 26 which sealingly engages the input shaft 12. The input shaft 12 has a bearing surface 28 on which is rotatably supported a sun gear 30 which is a component of the planetary gear set 16. The input shaft 12 also has a plurality of teeth 32 formed thereon which are components of the clutch assembly 18.

The output shaft 14 has splined thereto a hub 34 which has formed thereon a plurality of teeth 36 which are components of the clutch assembly 18. In the alternative, the hub assembly 34 can be manufactured as a two-piece component, one portion of which is continuously splined to the output shaft 14 and another portion thereof which is connectible with the output shaft 14 via a friction device. The alternative construction is most useful in drive systems having two output members, one of which is selectively driven. This arrangement would find use in four wheel drive type vehicles wherein it is desirable to direct the output power from the shaft to either or both of two drive axles. For the present description, it will be considered that a single output member is being used. The output shaft 14 in this instance, will be connected with a differential type gear set, not shown, to supply power to the driving wheels of a vehicle, not shown.

The planetary gear arrangement 16 also includes a ring gear 38 which is secured in the housing 20 and is therefore rotatably stationary relative to the housing. A planet carrier 40 is also a component of the planetary arrangement 16. The planet carrier 40 rotatably supports a plurality of pinion gears 42 which are disposed in meshing relation with the sun gear 30 and the ring gear 38. The carrier 40 has formed thereon, a plurality of teeth 44 which are components of the clutch assembly 18.

The clutch 18 also has teeth 46 formed on the sun gear 30 and further includes a pair of sleeve member 48 and 50. The sleeve member 48 has teeth 52 formed thereon which engage the teeth 36 formed on the hub 34. The sleeve 50 is rotatably supported in the sleeve 48 and has formed thereon a plurality of teeth 54 which, as seen in the drawing, mesh with or engage the teeth 32 of the input shaft 12 and the teeth 36 of the hub 34.

A clutch control member 56 is selectively operable to move the sleeve 48 between positions H, N, L which represent high, neutral and low drive conditions within the gear arrangement. The clutch control member 56 is shown positioned in the H position and due to the connection between gear teeth 32, 54 and 36, the clutch 18 provides a direct drive between the input shaft 12 and the output shaft 14. The sun gear 30, at this time, is disconnected from the input shaft 12 and therefore free of direct rotary influence therefrom.

When the clutch control 56 is moved rightward to the N position, the teeth 54 will engage only with the teeth 32 while the teeth 52 of sleeve 48 remain engaged with the teeth 36. Since the sleeve 50 is free to rotate relative to the sleeve 48, the input shaft 12 and the output shaft 14 are free from any drive interconnection and are therefore in a neutral or nondrive transmissions condition. The sun gear 30 remains free of direct influence from the input shaft 12.

When the clutch control 56 is moved further rightward to the L position, the teeth 54 of sleeve 50 will be engaged with both teeth 32 of the input shaft 12 and teeth 48 of the sun gear 30. Also, in the L position, a plurality of teeth 58 formed on the output surface of the sleeve 48 will engage the teeth 44 on the carrier 40. In the L position, an underdrive or reduction ratio is provided between the input shaft 12 and the output shaft 14. Due to the connection between the gear teeth 32, 54 and 46, the sun gear 30 will rotate with the input shaft 12, due to the connection between the teeth 58 and 44, and the connection between teeth 52 and 36, the carrier 40 will rotate with the output shaft 14. Since the ring gear 38 is held stationary, a reduction drive occurs between the input shaft 12 (sun gear 30) and the output shaft 14 (carrier 40).

As mentioned above, during the direct drive or H position of the clutch 18 shown, the sun gear 30 and the carrier 40 are free from direct rotational influence of the respective input shaft 12 and output shaft 14. Thus, the planetary gear arrangement 16 can remain stationary during the direct drive, greatly improving the efficiency of the two-speed drive connection. During direct drive, there will be relative rotation at the bearing support between the sun gear 30 and the input shaft 12. This relative rotation can be accommodated quite easily by supplying a small amount of lubricating fluid through a passage 60 to the bearing interface between these relatively rotating members.

During the neutral condition, the planetary gear arrangement is also free from direct rotary influence from the input shaft 12 and output shaft 14. The two-speed arrangement would generally be placed in the neutral condition when the vehicle is to be towed. This reduces the energy required to tow the vehicle. It may also be desirable to have the shaft 12 rotating while the shaft 14 remains stationary. Such a situation might occur when a power take-off unit is connected to operate with the shaft 12. Under such conditions, the two-speed arrangement is placed in a neutral condition and provides the advantage of reduced power loss by having the gear members remain stationary.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A two-speed drive arrangement comprising:
   a stationary housing; an input member rotatably supported in said stationary housing; an output member; a planetary gear arrangement having a first member rotatably supported on said input member, a second member secured to said stationary housing and a third member; and clutch means having a first position for simultaneously connecting said first member for conjoint rotation with said input member and for connecting said third member for conjoint rotation with said output member and a second position for directly connecting said input member to said output member, said clutch means including a first sleeve member longitudinally slidably disposed on and continuously rotatable with said output member and engageable with said third member when said clutch means is in said first position and a second sleeve rotatably supported by and movable with said first sleeve member and also being continuously rotatable with said input member and engageable with said first member when said clutch means is in said first position.

2. A two-speed drive arrangement comprising:
   a stationary housing; an input shaft rotatably supported in said stationary housing; an output member; a planetary gear arrangement having a sun gear rotatably supported on said input shaft, a ring gear secured to said stationary housing and a planet carrier assembly having pinion gears rotatably mounted thereon meshing with the sun gear and ring gear; and clutch means having a first position for simultaneously connecting said sun gear for conjoint rotation with said input shaft and for connecting said planet carrier assembly for conjoint rotation with said output member and a second position for directly connecting said input shaft to said output member, said clutch means including a first sleeve member longitudinally slidably disposed on and continuously rotatable with said output member and having teeth selectively engageable with said planet carrier assembly when said clutch means is in said first position and a second sleeve rotatably supported by and movable with said first sleeve member and also being continuously rotatable with said input shaft and having teeth selectively engageable with said sun gear when said clutch means is in said first position.

3. A two-speed drive arrangement comprising:
   a stationary housing; an input member rotatably supported in said stationary housing; an output member; a planetary gear arrangement having a first member with clutch means formed thereon rotatably supported on said input member, a second member secured to said stationary housing and a third member having clutch means formed thereon; and clutch assembly means movable to a first position for simultaneously connecting said first member for conjoint rotation with said input member and for connecting said third member for conjoint rotation with said output member and movable to a second position for directly connecting said input member to said output member, said clutch assembly means including a first sleeve member longitudinally slidably disposed on and continuously rotatable with said output member and having clutch means engageable with said clutch means on said third member when said clutch assembly means is in said first position and a second sleeve rotatably supported by and movable with said first sleeve member and continuously rotatably connected with said input member and having clutch means engageable with said clutch means on said first member when said clutch means is in said first position, and said clutch assembly means being movable to a third position disconnecting said input member from said planetary gear arrangement and from said output member to establish a neutral condition in said two-speed drive arrangement.

* * * * *